(12) United States Patent
Hung

(10) Patent No.: US 7,728,840 B2
(45) Date of Patent: Jun. 1, 2010

(54) SLIDING DATA BUFFERING FOR IMAGE PROCESSING

(75) Inventor: Ching-Yu Hung, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 1130 days.

(21) Appl. No.: 10/936,342

(22) Filed: Sep. 7, 2004

(65) Prior Publication Data

US 2005/0052463 A1    Mar. 10, 2005

Related U.S. Application Data

(60) Provisional application No. 60/500,274, filed on Sep. 4, 2003.

(51) Int. Cl.
*G06T 1/60* (2006.01)

(52) U.S. Cl. ..................................................... 345/530

(58) Field of Classification Search .................. 345/531, 345/16, 536, 538, 539, 543, 548, 562, 654, 345/806, 511, 521, 530, 473; 712/226, 224, 712/16; 395/800, 376, 94, 474; 348/181; 711/171; 715/781; 717/9; 360/72.2
See application file for complete search history.

(56) References Cited

U.S. PATENT DOCUMENTS

| 5,606,707 A * | 2/1997 | Tomassi et al. | 345/418 |
| 5,956,519 A * | 9/1999 | Wise et al. | 712/16 |
| 6,067,098 A * | 5/2000 | Dye | 345/531 |
| 6,212,628 B1 * | 4/2001 | Abercrombie et al. | 712/226 |
| 6,263,494 B1 * | 7/2001 | Shindo | 717/168 |
| 6,900,811 B2 * | 5/2005 | Sandford | 345/539 |
| 2002/0145611 A1 * | 10/2002 | Dye et al. | 345/543 |
| 2003/0018884 A1 * | 1/2003 | Wise et al. | 712/300 |

* cited by examiner

*Primary Examiner*—Amare Mengistu
*Assistant Examiner*—Aaron M Guertin
(74) *Attorney, Agent, or Firm*—Robert D. Marshall, Jr.; W. James Brady; Frederick J. Telecky, Jr.

(57) ABSTRACT

A method for managing image processing data buffers for processes having overlap input data between iterations includes loading a data buffer with an initial input data array and performing an image data array operation on the input data array. The method repeats the following steps for plural iterations including loading the data buffer with new input data forming a new input data array for a next iteration and performing the input data array operation on the new input data array. The overlap data consists of pixels at an end of each scan line. Loading new input data includes loading pixels following the overlap data for each scan line.

19 Claims, 2 Drawing Sheets

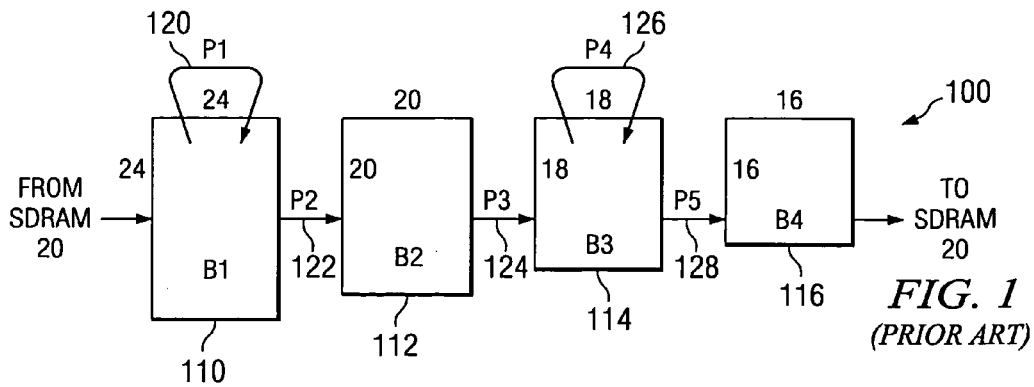
FIG. 1
*(PRIOR ART)*
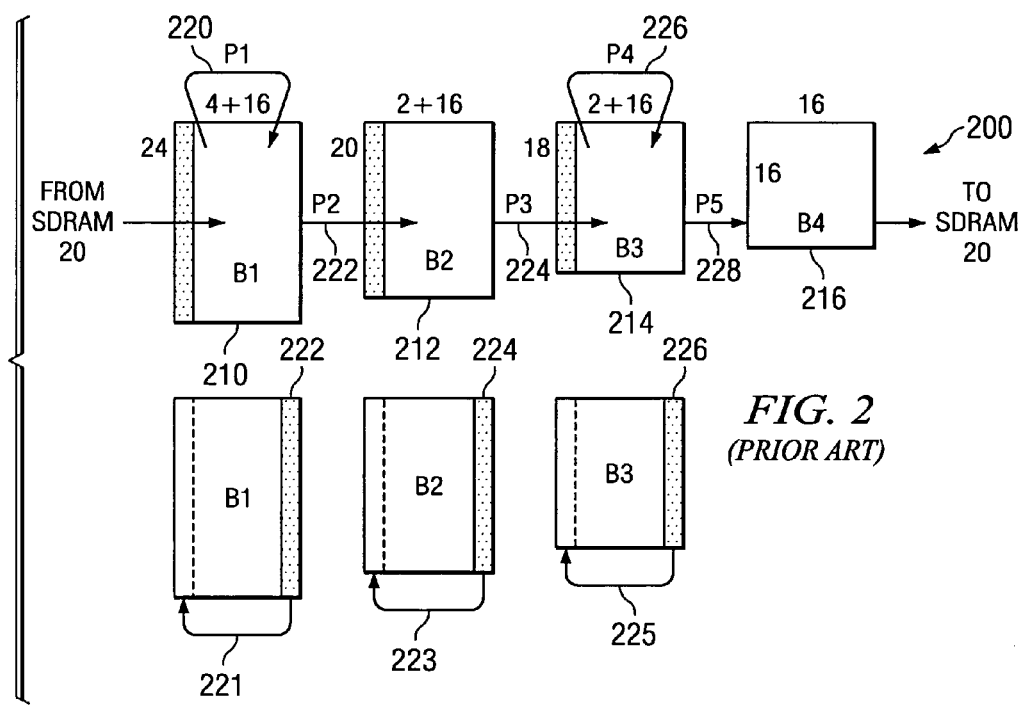
FIG. 2
*(PRIOR ART)*
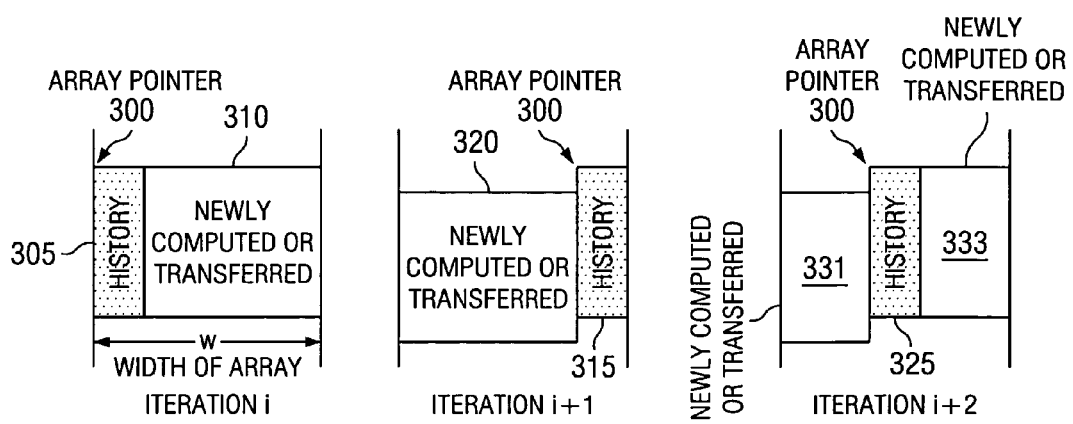
FIG. 3a FIG. 3b FIG. 3c

US 7,728,840 B2

SLIDING DATA BUFFERING FOR IMAGE PROCESSING

CONTINUING DATA

This application claims benefit of 60/500,274 filed Sep. 4, 2003.

TECHNICAL FIELD OF THE INVENTION

The technical field of this invention is date buffering in data processing operations.

BACKGROUND OF THE INVENTION

Embedded imaging applications on cost sensitive platforms usually involve digital data processors such as generic microprocessor, digital signal processors or specialized image coprocessors working with limited amount of on-chip memory. For most of these applications the amount of on-chip memory is not large enough to process an entire frame of an image. These applications typically use block processing, which is processing a small data block at a time through the processing algorithm stages. Image processing often has spatial dependency. Thus when an image is partitioned into same-sized blocks, an output block will require a larger input block. When output blocks are produced in raster-scan order, the input blocks overlap horizontally. Thus the input data for plural output blocks overlap. Furthermore, the image processing flow from input image to output image often involves multiple spatially dependent steps.

There are two conventional methods for processing and managing data arrays on-chip. These are over-processing and history buffer. Over-processing is simple in memory management, but inefficient in computation. History buffering is more efficient in computation, but conventionally takes time to move data within the history buffer. Thus there is a need in the art for a memory management technique that is easy to accomplish but also largely eliminates the need to move data, and thus achieves good computation efficiency.

SUMMARY OF THE INVENTION

This invention is a method for managing image processing data buffers for processes having overlapped input data between iterations. This method includes loading a data buffer with an initial input data array and performing an image data array operation on the input data array. The method repeats the following steps for plural iterations including: loading the data buffer with new input data, forming a new input data array for a next iteration, and performing the operation on the new input data array. The input data array includes N pixels of each scan line of a predetermined number of scan lines. The overlap data consists of pixels at an end of each scan line. Loading new input data includes loading pixels following the overlap data for each scan line.

Each iteration includes resetting an array pointer to a beginning of the overlap data. Each iteration also includes determining whether a next iteration would exceed a predetermined end memory address. Is so, then the overlap data is moved to a predetermined beginning memory address and the array pointer resets to the predetermined beginning memory address. The end memory address could be the physical end of memory or before static non-moving data.

This method could employ plural input data arrays loaded into differing parts of the data buffer. These input data arrays could have differing offsets from the beginning of the input data arrays. The faster moving input data arrays are disposed at higher addresses than the slower moving input data arrays.

BRIEF DESCRIPTION OF THE DRAWINGS

These and other aspects of this invention are illustrated in the drawings, in which:

FIG. 1 illustrates an example of performing an image processing function using prior art over-processing;

FIG. 2 illustrates performing the same image processing as illustrating in FIG. 1 using prior art history buffering;

FIGS. 3a, 3b and 3c illustrate performing an image processing function according to the sliding buffer method of this invention;

DETAILED DESCRIPTION OF PREFERRED EMBODIMENTS

Figure 4A:
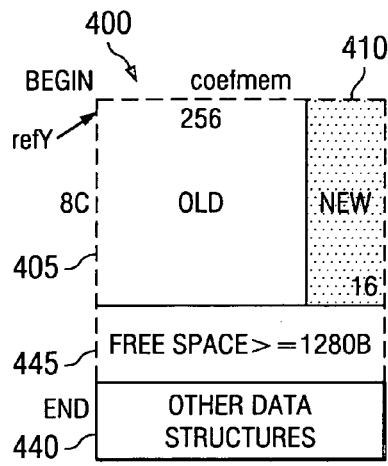
FIGS. 4a, 4b and 4c illustrate a motion vector calculation according to the sliding buffer method of this invention.

FIG. 1 illustrates a processing example 100 of the conventional over-processing approach. Data is recalled from an external memory such as synchronous dynamic random access memory (SDRAM) 20, processed and stored in a series of buffers 110 (B1), 112 (B2), 114 (B3) and 116 (B4). This processing example 100 includes five processing steps 120 (P1), 122 (P2), 124 (P3), 126 (P4) and 128 (P5). Data recalled from SDRAM 20 is initially stored in buffer 110 (B1). In this example, buffer 110 (B1) is an array of 24 by 24 pixels. Processing step 120 (P1) is an in place operation where the result is returned back to buffer 110 (B1). Processing step 122 (P2) is a filtering step. The resulting data is stored in buffer 112 (B2). Note that buffer 112 (B2) at 20 by 20 pixels is smaller than buffer 110 (B1). Thus processing step 122 (P2) needs more input that its output. Processing step 124 (P3) is another filtering step requiring more input than output. Processing step 124 (P3) inputs 20 by 20 pixel data from buffer 112 (B2) and outputs 18 by 18 pixel data to buffer 114 (B3), which has a size of 18 by 18 pixels. Processing step 126 (P4) is another in place operation. The results are stored in buffer 114 (B3). Processing step 128 (P5) is a filtering operation that converts data in buffer 114 (B3) into data stored in buffer 116 (B4) having a size of 16 by 16 pixels. The final data stored in buffer 116 (B4) is sent to SDRAM 20 to be stored. Due to the reduction in data size during the processing step 120 (P1) over processes by 125%, processing step 122 (P2) over processes by 56%, and processing steps 124 (P3) and 126 (P4) over process by 27%.

Image operations often employ overlapping input data for adjacent portions of output data. In the process illustrated in FIG. 2, some of the 24 by 24 pixel data input from SDRAM 20 into buffer 110 (B1) is also used for the next output portion. According to the over-processing technique all the data for the next output portion, including the overlap data, is recalled from SDRAM 20 into first buffer 110 (B1). It should be clear that this results in additional memory accesses for recall of the overlap data.

FIG. 2 illustrates processing example 200 according to the shifted history data buffer approach of the prior art. This processing example 200 includes buffer 210 (B1), buffer 212 (B2), buffer 214 (B3) and buffer 216 (B4) of the same sizes as the corresponding buffers of the previous example. This processing example 200 also includes similar processing steps 220 (P1), 222 (P2), 224 (P3), 226 (P4) and 228 (P5). Processing example 200 fully utilizes the horizontally overlapped, reusable portion of intermediate data in each of the buffers. This reduces computation time. Usable portions are shifted or moved to the left-most columns of each data buffer. Additional processing steps 221, 223 and 225 perform the data move operations. Processing step 221 moves overlap data 222 from its original area of memory to the beginning of buffer 210 (B1). This frees the just emptied memory locations to receive new non-overlap data to be recalled from SDRAM 20 for processing the next output portion. Similarly, processing step 223 moves overlap data 224 within buffer 212 (B2) and processing step 225 moves overlap data 226 within buffer 214 (B3). These data moves reduce the over processing of processing steps 220 (P1), 222 (P2), 224 (P3) and 226 (P4) relative to the corresponding processing steps 120 (P1), 122 (P2), 124 (P3) and 126 (P4) in processing example 100 of FIG. 1. Processing step 220 (P1) over processes by 50%, processing step 222 (P2) over processes by 25%, and processing steps 224 (P3) and 226 (P4) over process by 12.5%. This reduction in over processing comes at the expense of the additional data move processing steps 221, 223 and 225. This data movement takes additional time. Thus the shifted history data buffer scheme may or may not reduce overall processing time compared to the conventional over-processing method.

FIGS. 3a, 3b and 3c illustrate this invention, called the sliding buffer scheme. FIGS. 3a, 3b and 3c illustrate only one data buffer and the data management process over 3 iterations or 3 data blocks. FIG. 3a illustrates a starting data aligned position. History data 305 from a prior iteration is aligned in the left columns of memory. Newly computer or transferred data 310 fills the remaining width of the image array for all rows within the memory. Array pointer 300 points to the beginning of the array data at the first pixel of the first row of history data 305.

Following one process of the algorithm, such as process 120 (P1), later data becomes the history or overlap data. FIG. 3b illustrates that history data 315 is the data reused for the next iteration. The next iteration places newly computed or transferred data 320 in the buffer. Each horizontal line of history data 315 has a following line of new data 320. As illustrated in FIG. 3b, the following lines wrap to the first pixel of the next line of memory, and then fill normally until reaching the history data 315 for the next line.

Note that FIGS. 3a, 3b and 3c illustrate the memory in two dimensions having a width w equal to the image array width. This is merely an illustrative convention. In actuality the memory is a linear array of memory locations. If the image array stored includes w pixels in h lines and each pixel is one addressable memory location, then initially the array addresses range ADD as follows:

$$0 \leq ADD \leq h*w-1$$

The address of pixel P(i,j), where $0 \leq i < w$ and $0 \leq j < h$, is:

$$P(i,j)=i+w*j$$

In the example of FIGS. 3a, 3b and 3c, the history portion is the right most pixels of each line. Let the first pixel position of the history portion of each row be f, where $0 < f < w$. Then the history portion 315 of the prior buffered image array is stored in address locations f to w−1 for each row, or:

$$f+r*w \leq ADD_{History} \leq w*(r+1)-1$$

where: r is a row number from 0 to h−1. For the next iteration history portion 315 becomes the first pixels in each row. Each row of newly computed or transferred data 320 follows the corresponding row history data 315 (FIG. 3b). Thus the newly computed or transferred portion 320 of the next buffered image array is stored in address locations 0 to f−1 of each row, or:

$$w*(r+1) \leq ADD_{New} < f+w*(r+1)-1$$

As illustrated in FIGS. 3a, 3b and 3c, this invention does not move the history or overlap data. This invention instead moves array pointer 300 to the new start location within the buffer. This starts at the history or overlap data and places the new data in the correct offset from array pointer 300. Moving array pointer 300 effectively shifts the history data. For each iteration an offset is added to array pointer 300 equal to f. The history or overlap data occupies addresses:

$$Off+f+r*w \leq ADD_{History} \leq Off+w*(r+1)-1$$

and the new data occupies the addresses:

$$Off+w*(r+1) \leq ADD_{New} < Off+f++w*(r+1)-1$$

The separate views of FIGS. 3a, 3b and 3c illustrate that this resetting of array pointer 300 shifts or slides the data to higher memory addresses. This offset is equal to the width of the output block times the storage size per element. In this example the offset is 16.

This sliding buffer method saves processing time without requiring the time to move data within data buffers. Data objects in memory move with each iteration. Thus some address modification is needed. Typical algorithms spend enough time on the processing that the time spent on address modification is negligible. In this technique all buffers are marching slowing forward. Eventually data movement is required to create some free space for the buffer migration. If there is insufficient space to allow the buffers to slide throughout processing a horizontal band of the entire image, occasional data movement is required. If there is enough free space to slide the buffers for 20 iterations, then the cost of moving data is amortized over the 20 iterations and can be insignificant.

This method is applicable to motion estimation in video encoding. Motion estimation requires a large reference data window around the location of a current macroblock. There are various ways to manage reference data. Motion estimation is typically performed in hierarchical, data-dependent fashion. There are two major methods. One method transfers in only the part of reference data needed. This method has lower traffic requirement, but requires data-dependent transfers of typically small blocks. This can lead to processing time dependent on the latency through the external memory interface, which can be affected by other components in the system simultaneously accessing the external memory. Another method keeps the entire reference data window on-chip. This method employs larger, but more regular data transfers. Regularity of data transfers allows transfer requests to be submitted well ahead of when the data is needed for processing, and thus reduces uncertainty in overall processing time. This second method is usually more robust than the first method.

For video encoding of a 1280 pixel by 720 line or comparable frame size, a typical reference window of size is 256 pixels by 80 lines for each 16 by 16 macroblock. This supports ±112 horizontally by ±32 vertically range of search. Assuming a 200 MHz clock rate and a frame rate of 20 frames per second encode, the time that can be devoted to motion estimation is about 2700 cycles of the 200 MHz clock rate. Moving 240 columns of the reference data at 8 bytes per cycle, required 240*80/8=2400 cycles, a significant portion of the time budget. Thus it is not desirable to move the history data in the buffer. The other approach in prior art, of reloading the entire reference window, would require 256/16=16 times the external memory traffic required, and thus is not desirable either.

Figure 4B:
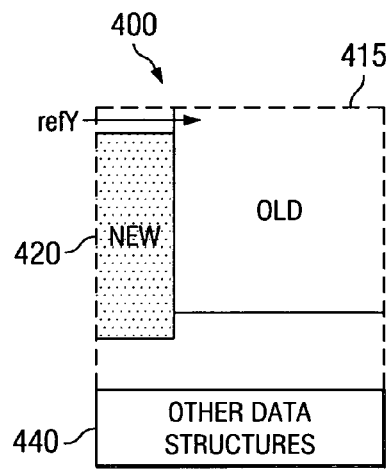
Figure 4C:
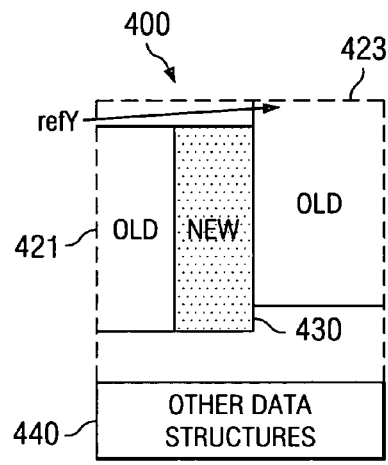

FIGS. 4a, 4b and 4c illustrate application of this technique to motion estimation. The following diagram shows using the sliding buffer scheme on the motion estimation reference buffer. FIG. 4a illustrates new data 410 appended following old data 405. The address pointer refY 400 points to the beginning of old data 405. The motion estimation buffer includes free space 445 between the active motion estimation data and other data structures 440. Moving the pointer refY 400 to the reference data array to manage the reference data takes no time. The 1280 pixel width of the image in this example yields up to 1280/16=80 macroblocks. This provides 80*16=1280 bytes of room to slide the reference data buffer and eliminates the need to move the reference data.

Figure 5:
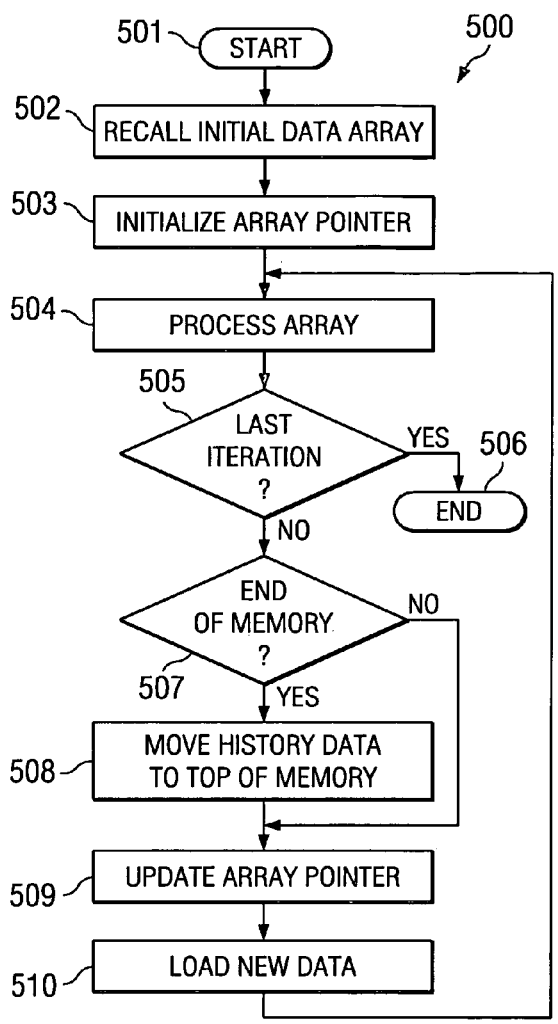
FIG. 5 illustrates a flow chart of the sliding buffer of this invention.

FIG. 5 illustrates a flow chart of method 500. Method 500 beings at start block 501, then recalls the initial data array (processing block 502). This involves recalling the first data array for a particular frame and storing this data at a predetermined starting address. Method 500 next initializes the array pointer to the predetermined starting address (processing block 503). Method 500 next processes the data of the array (processing block 504). This could be any of the data processing activities such as processes P1, P2, P3, P4 or P5 illustrated in FIG. 1 or 2.

Method 500 next tests to determine if the just completed process was the last iteration of a frame (decision block 505). If this was the last iteration (Yes at decision block 505), then method 500 is complete and ends at end block 506. The image processing operation then proceeds with other processing not involving the sliding buffer of this application.

If this was not the last iteration (No at decision block 505), then method 500 tests to determine if the sliding buffer has reached the end of memory (decision block 507). This test determines whether another slide of image data can fit within the data space remaining. Thus this test depends upon the amount of data slide for each iteration. The end of the memory may be the physical end of the memory or it may be the end of the memory available for sliding buffers. Thus this test takes into account any memory locations within the memory which do not slide, such as other data structures 440 illustrated in FIGS. 4a, 4b and 4c. Note further that these other data structures 440 need not be at the end of the physical memory but merely past the end of the address locations allocated to this sliding buffer. The memory may be divided into a plurality of zones with some of the zones allocated to sliding buffers and some allocated to static data structures such as other data structures 440. The test of decision block 507 determines if another iteration with another data slide would cross a memory boundary allocated to the current buffer.

If this was the end of the memory (Yes at decision block 507), then method 500 moves the history data to the top of the memory (processing block 508). This top of the memory could be the first physical memory location or the first memory location allocated to this buffer. The history data is the data from the precious iteration of processing block 504 that are to be used in processing block 504 of the next iteration. In the preferred embodiment of image operations, this history data is a predetermined number of last pixels of each scan line of the data array. This invention supposes that enough address space has been allocated to the current buffer that this data movement occurs infrequently and thus can be amortized over many iterations of the method.

If this was not the end of memory (No at decision block 507) or following moving the history data (processing block 507), then method 500 updates the array pointer (processing block 509). As previously described, the array pointer marks the beginning of valid data for processing block 504. If this was not the end of memory (No at decision block 507), then the updated array pointer points to the first address of the history data from the prior iteration. This is offset from the prior beginning location depending upon the amount of overlap between the input data of the prior iteration and the input data of the next iteration. This update of the array pointer is what causes the sliding buffer to slide. If this was the end of memory (Yes at decision block 507) and the history data has been moved to the top of memory (processing block 508), then the updated array pointer points to the first address of the moved history data. This will generally be the first address location of the memory or the first address location allocated to this buffer.

Method 500 then loads the new input data for the next iteration (processing block 510). In the image processing operations of this example, this new data includes pixels following each scan line of the history data. The equations above indicate how the addresses within the buffer are calculated. Note that this invention includes no limitation on the data structure of the frame buffer or other memory serving as the source of this new data. Control returns to processing block 504 to perform the data process for the next iteration. Method 500 remains within this loop until the last iteration is reached (Yes at decision block 505), and then ends via end block 506.

Figure 6:
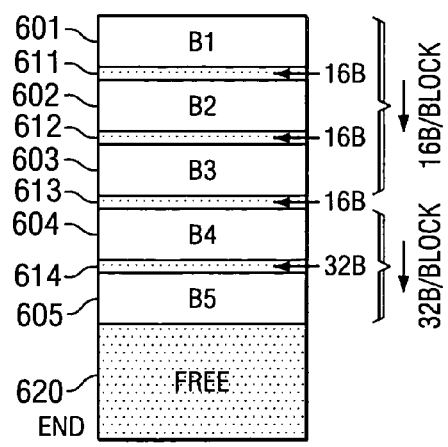
FIG. 6 illustrates employing plural image arrays sliding at differing speeds according to an additional embodiment of this invention.

FIG. 6 illustrates an example of handling of multiple sliding buffers. There are techniques to reduce the overhead of buffer management when there are multiple intermediate data buffers in the same block of on-chip memory using the sliding buffer scheme. Upon complete eliminate of over-processing in the horizontal direction, this results in processing N pixels wide for each step of the algorithm flow to get to the final N-pixel wide block output. Therefore, each intermediate buffer slides by N words.

Image processing is normally carried out in 8-bit or 16-bit words. When all intermediate arrays are in the same element size, all arrays are sliding at the same pace. In this case managing multiple buffers is no more difficult than managing a single buffer. Similar sized arrays can be separated by an amount to avoid collision during each slide. Additionally, by arranging the sliding buffers so that earlier updated buffers are later in memory, there is no need to leave any space between same-sliding-rate buffers for here to be no interference between the buffers.

Multiple sliding buffers are also compatible with non-sliding buffers. There might be temporary arrays that do not need to slide. These buffers have no history data to copy. For example, process 228 (P5) between buffers 214 (B3) and 216 (B4) in FIG. 2. Buffer 216 (B4) has no history data to relocate. The array pointer for buffer 216 (B4) can be moved at the same pace as other pointers, to thus manage all pointers the same way. There might be constant or parameter arrays that do not change in value in the inner loop, but are used in the inner loop computation. These buffers should not be relocated. These buffers can be located toward the end of the on-chip memory like other data structures 440 illustrated in FIGS. 4a, 4b and 4c.

Note that the data buffers do not have to have the same width, or same height. They just need to have the same data offset size and thus slide at the same speed. For example, where there are multiple color components per pixel, each component should be stored in a separate array. These differing color components would have the same offset per iteration and slide at the same speed.

There might be multiple sliding speeds. This could occur when there are both 8-bit and 16-bit elements in the intermediate arrays or when there is some resampling operation that changes the size of the block going through algorithm steps, there could be multiple sliding speeds in the data buffers. These need adequate spacing between groups that slide at different speed so that they do not collide.

FIG. 6 illustrates an example of differing sliding speeds. For example, a first group includes buffers 601 (B1), 602 (B2) and 603 (B3) which slide at 16 bytes per iteration. Buffers 601 (B1) and 602 (B2) are separated by a space 611. Buffers 602 (B2) and 603 (B3) are separated by a space 612. A second group including buffers 604 (B4) and 605 (B5) slide at 32 bytes per iteration. Buffers 603 (B3) and 604 (B4) are separated by a space 612. Buffers 604 (B4) and 605 (B5) are separated by a space 614. A free space 620 follows buffer 605 (B5) to the end of the memory. These two groups can be managed with the following memory allocation scheme. Buffers 604 (B4) and 605 (B5) will reach the end of the memory first. Buffers 601 (B1), 602 (B2) and 603 (B3) lag behind. This organization allows the faster second group to slide as much as possible before data movement is needed. Spaces 611, 612 and 614 remain constant as the buffers slide. Space 613 gradually increases at a rate corresponding to the difference in sliding rates of the first and second groups of buffers. Free space 620 decreases at the rate of sliding of the second group of buffers. When the bottom of the second group of buffers reaches the end of the memory, then all buffers need to be relocated. The buffers 601 (B1), 602 (B2), 603 (B3), 604 (B4) and 605 (B5) are moved to the top of memory with the second group (604 and 605) moved to higher memory locations than the first group (601, 602 and 603). This technique provides a maximum number of iterations before data movement is required.

Wrap-around addressing hardware works well with this sliding buffer scheme. Wrap-around addressing hardware enables normal operation past the end of predetermined end memory address and wraps the result to a predetermined start memory address. With wrap-around addressing sliding buffers will never reach the end of memory. The wrap-around addressing will just slide the intermediate arrays past the end address and wrap-around to the beginning address. Thus with wrap-around addressing hardware if all buffers are sliding at the same pace, there will never be a need for moving data.

With differing sliding rates, wrap-around addressing hardware enables better efficiency than the normal non-wrap-round memories. For example, the dual-rate buffer management scheme illustrated in FIG. 6 will last about twice the number of iterations before needing to move the data. Once the second group reaches the end of the memory in say N iterations, the half-sliding-rate first group has vacated about half of the free space at the top. Thus the faster second group can operate another N/2 iterations. By then the slower first group has moved half the original distance, leaving about one quarter of the memory space free. Thus the number of iterations before collision is given by the series:

N+N/2+N/4+ . . .

This series is known to converge to 2N. Thus wrap-around addressing hardware would enable about twice the number of iterations before requiring data movement than for an ordinary memory.

What is claimed is:

1. A method for managing image processing data buffers for processes having overlap input data between iterations comprising the steps of:
   loading a data buffer memory with an initial input data array at a predetermined starting memory address;
   performing an image processing operation on the input data array;
   repeatedly for plural iterations
      retaining the overlap input data within said data buffer memory at memory addresses of a last iteration thus neither recalling said overlap input data again nor moving said overlap input data within said data buffer memory to other memory addresses,
      loading the data buffer memory with new input data at memory addresses following the overlap input data between said last iteration and a next iteration, said new input data and said overlap input data thereby forming a new input data array, said new input data array thereby shifting as a whole in memory addresses within said data buffer memory relative to a prior input data array an amount equal to said overlap input data, and
      performing the input processing operation on the new input data array,
   until a last iteration is performed.

2. The method of claim 1, wherein:
   said input data array includes N pixels of each scan line of a predetermined number of scan lines;
   said overlap data consists of a M pixels at an end of each scan line, where N>M; and
   said step of loading the data buffer memory with new input data includes loading N–M pixels at locations following said overlap data for each of said predetermined number of scan lines, said new input data array consisting of M pixels of overlap data and N–M pixels of new input data for each of said predetermined number of scan lines.

3. The method of claim 1, wherein:
   each of said iterations further includes
      resetting an array pointer used to access data to perform the input processing operation to a beginning of said overlap data.

4. The method of claim 3, wherein:
   each of said iterations further includes
      determining whether a next iteration would exceed a predetermined end memory address of the data buffer memory,
      if the next iteration would exceed said predetermined end memory address of the data buffer memory, then moving said overlap data to a predetermined beginning memory address of the data buffer memory, and
      said step of resetting said array pointer resets said array pointer to said predetermined beginning memory address of the data buffer memory.

5. The method of claim 4, wherein:
   said predetermined end memory address of the data buffer memory is a physical end of memory.

6. The method of claim 4, further comprising the step of:
   storing static non-moving data near a physical end of memory of the data buffer memory; and
   wherein said predetermined end memory address of the data buffer memory is before said static non-moving data.

7. The method of claim 1, wherein:
   said step of loading the data buffer memory with new input data includes hardware address wrapping from a predetermined end memory address of the data buffer memory to a predetermined beginning memory address of the data buffer memory if said loading exceeds said predetermined end memory address of the data buffer memory.

8. A method for managing an image processing data buffer for processes having overlap input data between iterations comprising the steps of:

loading a single data buffer memory with a plurality of initial input data arrays at respective predetermined starting memory addresses;

performing an image processing operation on each of the input data arrays;

repeatedly for plural iterations retaining each overlap input data within said data buffer memory at memory addresses of a last iteration thus neither recalling said overlap input data again nor moving said overlap input data within said data buffer memory to other memory addresses, loading said data buffer memory with corresponding new input data at memory addresses following the corresponding overlap input data between a said last iteration and a next iteration for each of the input data arrays, said new input data and said corresponding overlap input data thereby forming a corresponding new input data array, each new input data array thereby shifting as a whole in memory addresses within said data buffer memory relative to a corresponding prior input data array an amount equal to said corresponding overlap input data, and performing the input processing operation on the each of the plurality of new input data arrays, until a last iteration is performed.

9. The method of claim 8, wherein:

each of said input data arrays includes N pixels of each scan line of a predetermined number of scan lines;

each of said overlap data consists of a M pixels at an end of each scan line, where N>M; and said step of loading said data buffer memory with corresponding new input data includes loading N−M pixels at locations following said overlap data for each of said predetermined number of scan lines for each of the input data arrays, each of said new input data arrays consisting of M pixels of overlap data and N−M pixels of new input data for each of said predetermined number of scan lines.

10. The method of claim 8, wherein:

each of said iterations further includes resetting an array pointer for each of said new input data arrays used to access data to perform the respective input processing operations to a beginning said corresponding overlap data.

11. The method of claim 10, wherein:

each of said iterations further includes determining whether a next iteration for any of said new input data arrays would exceed a predetermined end memory address of the data buffer memory, if the next iteration for any of said new input data arrays would exceed said predetermined end memory address of the data buffer memory, then moving said overlap data of each of said new input data arrays to a corresponding predetermined beginning memory address of the data buffer memory, and said step of resetting said array pointer for each of said new input data arrays resets said array pointer to said corresponding predetermined beginning memory address of the data buffer memory.

12. The method of claim 11, further comprising the step of:

storing static non-moving data near a physical end of memory of the data buffer memory; and wherein each of said predetermined end memory addresses of the data buffer memory is before said static non-moving data.

13. The method of claim 8, wherein:

said step of loading said data buffer with corresponding new input data includes hardware address wrapping from a corresponding predetermined end memory address of the data buffer memory to a corresponding predetermined beginning memory address of the data buffer memory if said loading exceeds said corresponding predetermined end memory address of the data buffer memory.

14. A method for managing an image processing data buffer for processes having overlap input data between iterations comprising the steps of:

loading a single data buffer memory with a plurality of initial input data arrays at respective predetermined starting memory addresses;

said overlap data for a first input data array having a first offset from a beginning of said first input data array;

said overlap data for a second input data array having a second offset from a beginning of said second input data array greater than said first offset;

said second input data array being loaded into said data buffer at addresses greater than said first input data array;

performing an image processing operation on each of the input data arrays;

repeatedly for plural iterations retaining each overlap input data within said data buffer memory at memory addresses of a last iteration thus neither recalling said overlap input data again nor moving said overlap input data within said data buffer memory to other memory addresses, loading said data buffer memory with corresponding new input data at memory addresses following the corresponding overlap input data between said last iteration and a next iteration for each of the input data arrays, said new input data and said corresponding overlap input data thereby forming a corresponding new input data array, each new input data array thereby shifting as a whole in memory addresses within said data buffer memory relative to a corresponding prior input data array an amount equal to said corresponding overlap input data, and performing the input processing operation on the each of the plurality of new input data arrays, until a last iteration is performed.

15. The method of claim 14, wherein:

each of said input data arrays includes N pixels of each scan line of a predetermined number of scan lines;

each of said overlap data consists of a M pixels at an end of each scan line, where N>M; and said step of loading said data buffer memory with corresponding new input data includes loading N−M pixels at locations following said overlap data for each of said predetermined number of scan lines for each of the input data arrays, each of said new input data arrays consisting of M pixels of overlap data and N−M pixels of new input data for each of said predetermined number of scan lines.

16. The method of claim 14, wherein:
each of said iterations further includes
resetting an array pointer for each of said new input data arrays to a beginning said corresponding overlap data.

17. The method of claim 16, wherein:
each of said iterations further includes
determining whether a next iteration for any of said new input data arrays would exceed a predetermined end memory address of the data buffer memory,
if the next iteration for any of said new input data arrays would exceed said predetermined end memory address of the data buffer memory, then
moving said overlap data of each of said new input data arrays to a corresponding predetermined beginning memory address of the data buffer memory, and
said step of resetting said array pointer for each of said new input data arrays resets said array pointer to said corresponding predetermined beginning memory address of the data buffer memory.

18. The method of claim 17, further comprising the step of:
storing static non-moving data near a physical end of memory of the data buffer memory; and
wherein each of said predetermined end memory addresses of the data buffer memory is before said static non-moving data.

19. The method of claim 14, wherein:
said step of loading said data buffer with corresponding new input data includes hardware address wrapping from a corresponding predetermined end memory address of the data buffer memory to a corresponding predetermined beginning memory address of the data buffer memory if said loading exceeds said corresponding predetermined end memory address of the data buffer memory.

* * * * *